United States Patent
Oreyang

(10) Patent No.: US 9,958,908 B2
(45) Date of Patent: May 1, 2018

(54) MINIATURIZED TOUCH KEYBOARD STRUCTURE

(71) Applicant: ACROX TECHNOLOGIES CO., LTD., Taipei (TW)

(72) Inventor: Yia-Yuan Oreyang, Taipei (TW)

(73) Assignee: ACROX TECHNOLOGIES CO., LTD., Taipei (TW)

( * ) Notice: Subject to any disclaimer, the term of this patent is extended or adjusted under 35 U.S.C. 154(b) by 101 days.

(21) Appl. No.: 15/057,133

(22) Filed: Mar. 1, 2016

(65) Prior Publication Data

US 2017/0255236 A1 Sep. 7, 2017

(51) Int. Cl.
*G06F 1/16* (2006.01)

(52) U.S. Cl.
CPC .......... *G06F 1/1692* (2013.01); *G06F 1/1616* (2013.01); *G06F 1/1666* (2013.01)

(58) Field of Classification Search
None
See application file for complete search history.

(56) References Cited

U.S. PATENT DOCUMENTS

| 2007/0091070 A1* | 4/2007 | Larsen | G06F 3/0213 345/168 |
| 2008/0203817 A1* | 8/2008 | Luo | G06F 1/1616 307/64 |
| 2012/0098782 A1* | 4/2012 | Nam | G06F 3/044 345/174 |

* cited by examiner

*Primary Examiner* — Nicholas Lee
(74) *Attorney, Agent, or Firm* — Leong C. Lei

(57) ABSTRACT

A miniaturized touch keyboard structure includes a keyboard and at least one touchpad. The keyboard includes a plurality of control keys and a blank key and the keyboard includes at least one control module arranged therein. The touchpad is directly arranged on the keyboard with one of control keys of the keyboard being converted into the touchpad. The touchpad is electrically connected to the control module. A relative position of the touchpad with respect to the blank key is such that the touchpad is located immediately leftward or rightward or both leftward and rightward of the blank key and the touchpad has a surface area that is smaller than or substantially equal to 2×2 cm². Further, the touchpad has touch sensitivity and speed that are controlled by predetermined software.

14 Claims, 5 Drawing Sheets

MINIATURIZED TOUCH KEYBOARD STRUCTURE

TECHNICAL FIELD OF THE INVENTION

The present invention relates generally to a miniaturized touch keyboard structure, and more particularly to an arrangement that a touchpad is directly arranged in a keyboard with one of control keys of the keyboard being converted into the touchpad, which is located immediately leftward or rightward or both leftward and rightward of a blank key; and the touchpad has a surface area smaller than or substantially equal to 2×2 cm² to correspond in size to the other control keys so that the touchpad does not consume the limited space of the keyboard and provides a user with an excellent touch operation so that the user, when operating the keyboard, may directly use the touchpad arranged in the keyboard to control a cursor on a screen for conducting control instructions; and, the touchpad has touch sensitivity and speed that are controlled by predetermined software for controlling the touch sensitivity and cursor movement speed.

DESCRIPTION OF THE PRIOR ART

With the advent of the electronic information era, electronic information processing devices (such as personal computers, notebook computers, and smart mobile devices or portable phones) become a must for personal use and also serve as a primary electronic tool for data storage. However, heretofore, the electronic information processing devices rely on keyboards as a primary input device for entering figures, symbols and texts and executing software programs.

A conventional keyboard is generally composed of a number of keys or buttons. These keys or buttons include alphabetic keys, symbol keys, numeric keys, control keys, and a blank key to allow a computer user to enter numbers, symbols, and characters or to execute application programs. Further, taking a desktop computer as an example, the keyboard is a stand-alone device and is connected, in wireless or wired transmission, with the desktop computer. However, since the keyboard comprises only keys or buttons thereon, it is often to additionally connect a computer mouse to the desktop computer to allow the computer use to use the mouse to control a cursor on a screen for controlling and executing instructions.

As shown in FIG. 1, for notebook computers, a conventional notebook computer A that is provided for the purposes of portability, light weight, and simplification is structured such that a keyboard module A1 is built in a host device of the notebook computer A so that a user does not need to connect to an external keyboard device. However, the keyboard module A1 of the notebook computer A is also composed of keys or buttons only. To allow the computer user to more easily control a cursor on a screen for controlling and executing instructions, an independent touchpad A2 must be additionally provided outside the keyboard module A1 of the notebook computer A so that the touchpad A2 may take the place of a computer mouse and the touchpad A1 may be used to control the cursor on the screen for controlling and executing instructions.

Thus, a major issue to be addressed in the present invention is to provide a keyboard such that a control key unit, under the conditions of a limited surface area and a prescribed relative positional relationship, may offer a touch-sensitive mode featuring easy touch control, fast movement of a cursor, and control and execution of an instruction.

SUMMARY OF THE INVENTION

In view of the above problems, the present invention provides a miniaturized touch keyboard structure, which comprises: a keyboard and at least one touchpad. The keyboard comprises a plurality of control keys and a blank key. The keyboard comprises at least one control module arranged therein. The touchpad is directly arranged in the keyboard and is electrically connected to the control module. A relative position of the touchpad with respect to the blank key is such that the touchpad is located in the keyboard and is located immediately leftward or rightward or both leftward and rightward of the blank key and the touchpad has a surface area that is smaller than or substantially equal to 2×2 cm². Further, the touchpad can be a capacitive device so that when a finger of a user touches the touchpad, the capacitance of the touchpad is varied and the control module detects the variation of the capacitance for conversion into coordinates to indicate position and displacement of the finger of the user.

The present invention provides a miniaturized touch keyboard structure, wherein the touchpad has touch sensitivity and cursor movement speed that are controlled by predetermined software so that a finger of a user is allowed to conduct high sensitivity movement and control and execution of screen cursor within an effective area of the touchpad.

The technical features of the present invention are that the touchpad is directly arranged in a keyboard and is located immediate leftward or rightward or both leftward and rightward of a blank key and the touchpad has a surface area that is smaller than or substantially equal to 2×2 cm² to allow a user to conduct a touch operation with the touchpad in the keyboard, such as a touch mode of fast moving a cursor and control and execution of an instruction, without externally connected with a mouse device or connection with an additional touchpad outside the keyboard module.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
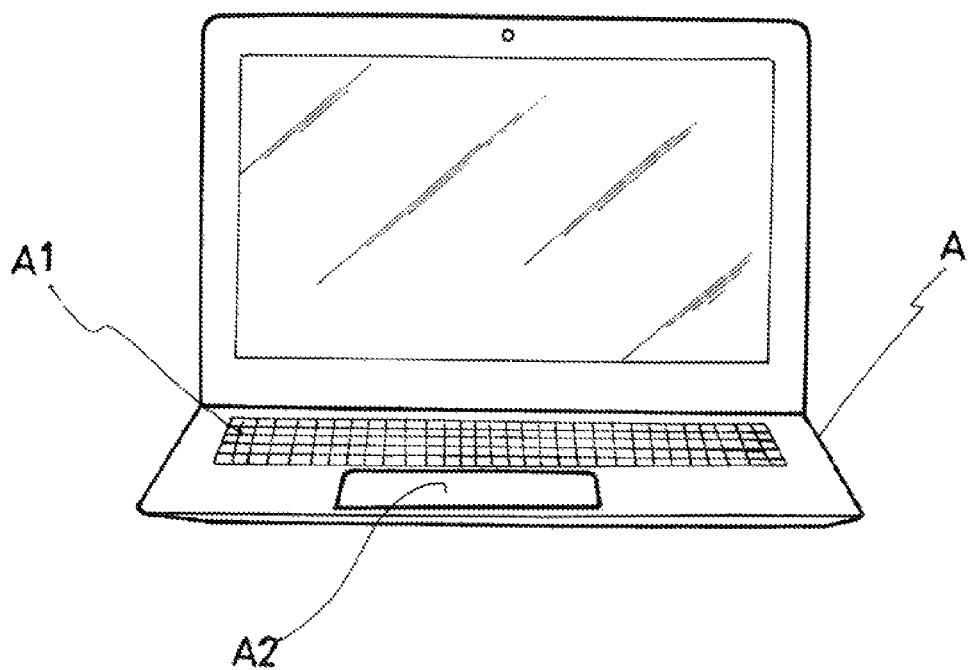
FIG. 1 is a schematic view illustrating a notebook computer in which a conventional keyboard and a touchpad are included.
Figure 2:
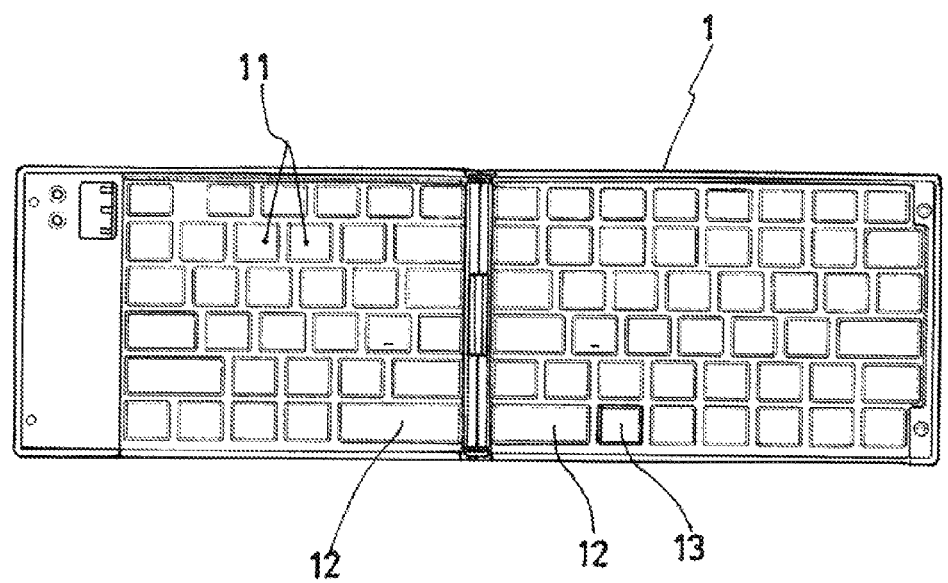
FIG. 2 is a top plan view illustrating a keyboard structure according to an embodiment of the present invention.
Figure 3:
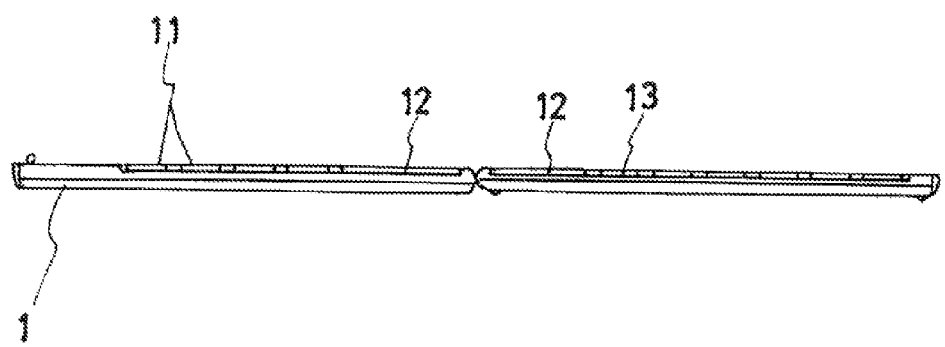
FIG. 3 is a side elevational view illustrating the keyboard structure according to the embodiment of the present invention.

Referring to FIGS. 2 and 3, the present invention provides a miniaturized touch keyboard structure, which comprises: a keyboard 1 and at least one touchpad 13.

The keyboard 1 can be a mechanical keyboard, membrane keyboard, or other types of keyboard modules but not limited thereto.

Figure 8:
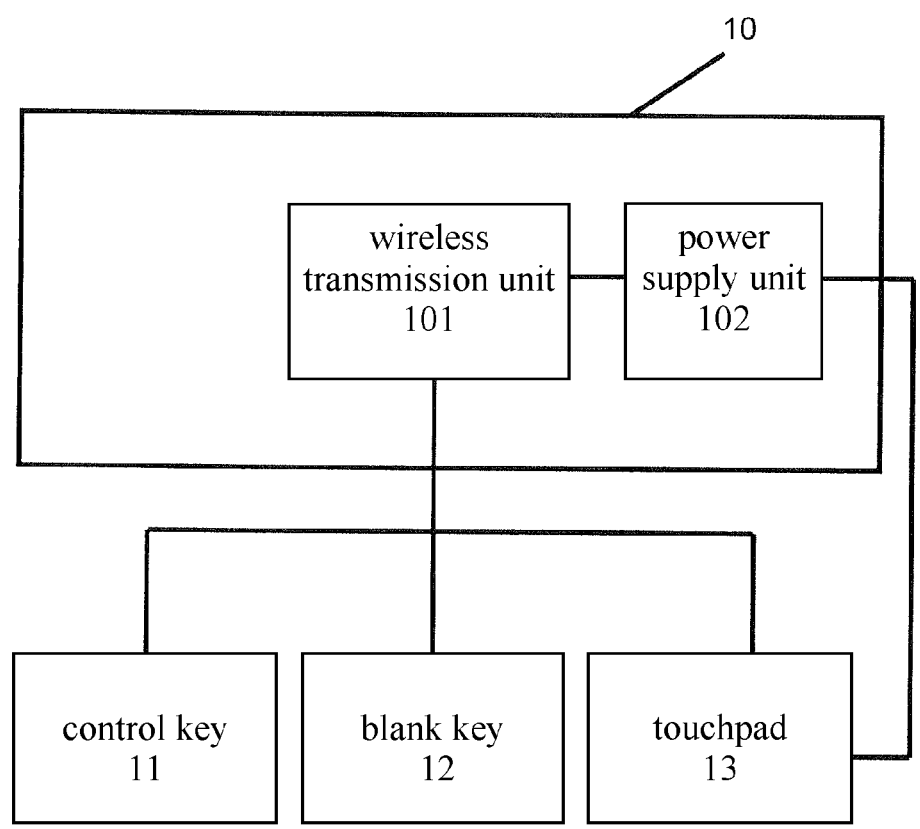
FIG. 8 is a schematic view illustrating a keyboard structure according to a further embodiment of the present invention.

As shown in FIG. 2, a foldable keyboard 1 is taken as an example for illustration. The keyboard 1 comprises a plurality of control keys 11 and blank keys 12. The keyboard 1 is provided, in the interior thereof, with at least one control module 10. The control module 10 comprises a touch controller (such as a CFN touch controller), as shown in FIG. 8.

Figure 4:
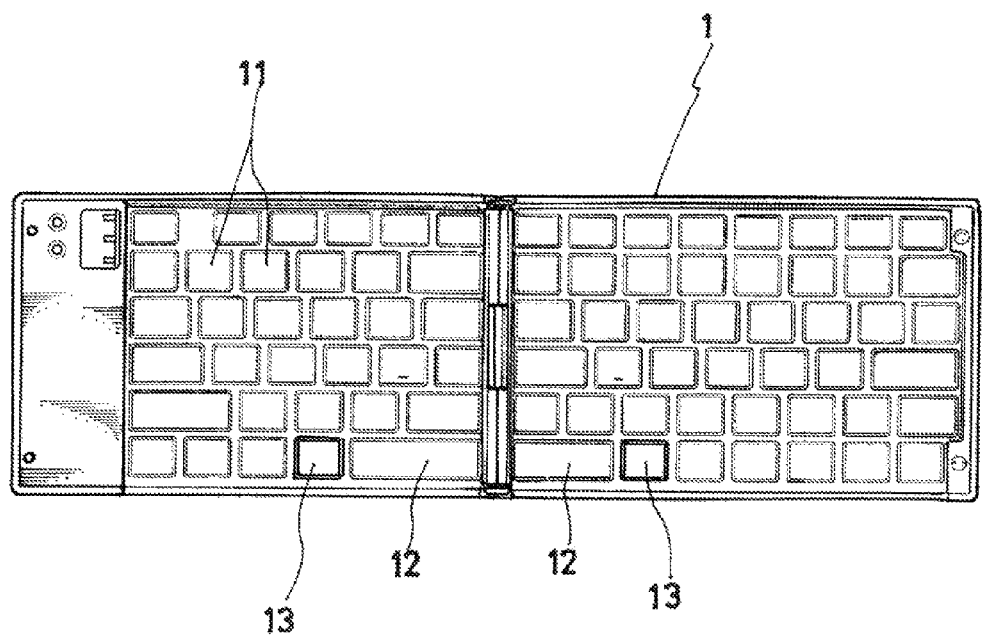
FIG. 4 is a top plan view illustrating a keyboard structure according to another embodiment of the present invention.
Figure 5:
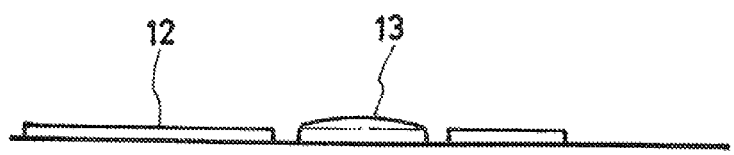
FIG. 5 is a side elevational view illustrating keys of the keyboard structure according to the present invention.

The touchpad 13 is directly mounted in the keyboard 1 and is electrically connected to the control module 10 of the keyboard 1. The touchpad 13 is arranged at a location immediately rightward of the blank keys 12 (as shown in FIG. 2) or immediately leftward of the blank keys (as shown in FIG. 4), or, alternatively, arranged immediately rightward and leftward of the blank keys 12. Further, the touchpad 13 has a surface area that is smaller than or substantially equal to 2×2 cm². Further, the touchpad 13 has a surface that is planar, convex curved, or recessed (as shown in FIG. 5).

The touchpad 13 is made of Mylar material, or alternatively, the surface of the touchpad 13 is formed of Mylar material. Mylar is a PET polyester film having the features of low water absorbability, low shrinkage, high temperature, and excellent insulation property and thus, can be the best surface structure for the touchpad.

The CFN touch controller of the control module 10 features high signal-to-noise ratio (SNR) and thus having a relatively high resolution, by which even within a very limited surface area, the touchpad 13 still provide high touch preciseness. As such, the touchpad 13 may be matched with a predetermined high image quality display to allow for use of the touchpad 13 to precisely control a cursor on the high image quality display. The high image quality display can be a high definition (HD) display, or a display having a display performance at least of the level of full HD.

An example will be taken for illustration, in which the touchpad 13 is a capacitive touch device so that when a finger of a user touches the touchpad 13, the capacitance of the touchpad 13 is varied and the control module of the keyboard 1 detects the variation of capacitance to convert into coordinates to indicate position and displacement of the finger of the user.

The touchpad 13 may have sensitivity and speed of touch operation that are controlled by predetermined software so that the finger of the user is allowed to conduct, within a limited area of the touchpad 13, high sensitivity operation of control of a cursor on the screen for control and execution of an instruction.

Figure 6:
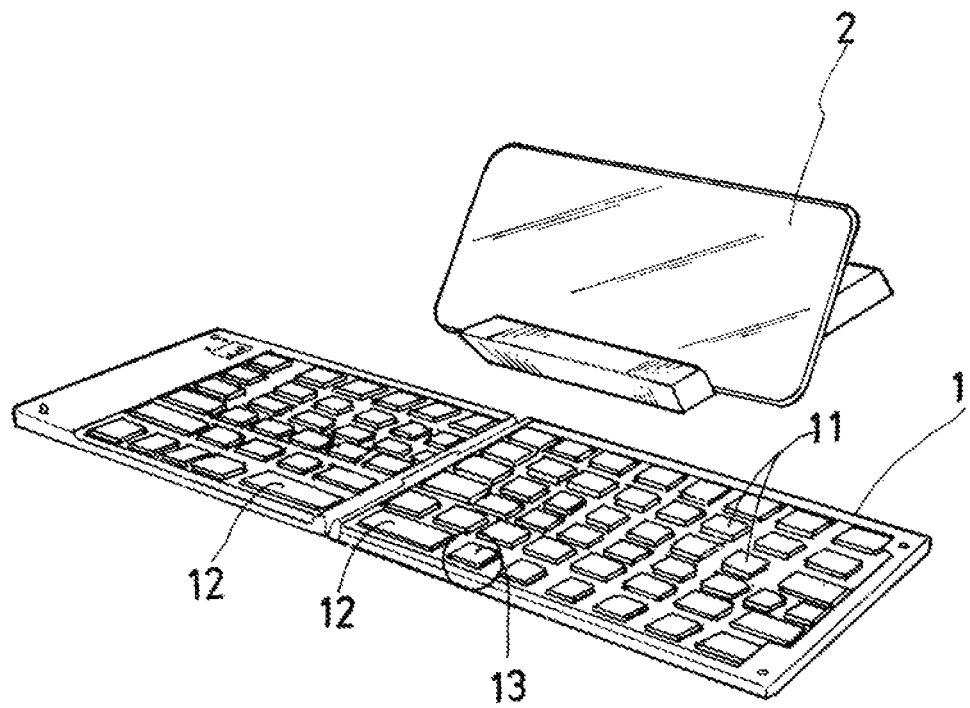
FIG. 6 is a schematic view illustrating an example application of the keyboard structure of the present invention.
Figure 7:
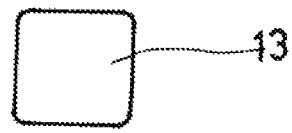
FIG. 7 is an enlarged view of an encircled portion of FIG. 6.

Referring to FIGS. 6, 7, and 8, the keyboard 1 may be connected, via wireless transmission (such as Bluetooth transmission), with an electronic device 2. For example, the control module 10 may comprise a wireless transmission unit 101 (such as a Bluetooth transmission unit) and a power supply unit 102. The wireless transmission unit 101 is electrically connected to the plurality of control keys 11, the blank keys 12, and the touchpad 13 so that signals from the plurality of control keys 11, the blank keys 12 and, the touchpad 13 can be transmitted wirelessly through the wireless transmission unit 101 to provide connection between the keyboard 1 and the electronic device 2 through the wireless transmission unit 101.

The power supply unit 102 generally supplies electrical power to the control module 10. The power supply unit 102 is electrically connected to the wireless transmission unit 101 and the touchpad 13 to supply electrical power to the wireless transmission unit 101 and the touchpad 13. The power supply unit 102 can be a disposable battery or a rechargeable battery.

The keyboard 1 can be connected, through wireless transmission (such as Bluetooth transmission), with an electronic device 2 and with the touchpad 13 is directly arranged in the keyboard 1 and located at a rightward position or leftward position adjacent to the blank keys 12 or at both rightward and leftward positions adjacent to the blank keys 12 so that when a user is using the keyboard 1, at a location corresponding to the blank keys 12, a most convenient and efficient way can be taken to move to the touchpad 13, to allow the user to directly operate the touchpad 13 built in the keyboard 1 to control a cursor on a screen of the electronic device 2 to control and execute various instructions without an additionally connected external mouse device, or additionally include an external touchpad device outside the keyboard module.

Further, the keyboard 1 can be connected, through wired transmission, to an electronic device 2.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A miniaturized touch keyboard structure, comprising:
    a keyboard, which comprises a plurality of control keys and a blank key functioning as a spacebar key, the keyboard comprising at least one control module arranged therein, the control module comprising a touch controller to correspond to a touchpad for conducting a touch operation and to use a high signal-to-noise ratio (SNR) thereof to provide relatively high recognition speed and sensitivity for allowing the touchpad to achieve relatively high preciseness of touch operation within a limited area; and at least one touchpad, which is arranged in the keyboard and immediately adjacent to the blank key and is electrically connected to the control module, such that the touchpad is set at each of two locations that are respectively and immediately rightward and leftward of the blank key, the touchpad having a surface area that is smaller than or substantially equal to $2\times 2$ cm$^2$.

2. The miniaturized touch keyboard structure according to claim 1, wherein the touchpad has a surface that is planar, convex curved, or recessed.

3. The miniaturized touch keyboard structure according to claim 1, wherein the touchpad has sensitivity and moving speed of a touch operation that are controlled by predetermined software.

4. The miniaturized touch keyboard structure according to claim 1, wherein the touchpad is formed of a Mylar material of PET polyester film or the touchpad has a surface that is formed of a Mylar material of PET polyester film.

5. The miniaturized touch keyboard structure according to claim 1, wherein the control module comprises a wireless transmission unit and a power supply unit, the wireless transmission unit being electrically connected to the control keys, the blank key, and the touchpad, a signal from the control keys, the blank key, and the touchpad being transmitted wirelessly through the wireless transmission unit; and the power supply unit supplies electrical power to the control module.

6. The miniaturized touch keyboard structure according to claim 5, wherein the power supply unit is electrically connected to the wireless transmission unit and the touchpad to supply electrical power to the wireless transmission unit and the touchpad.

7. The miniaturized touch keyboard structure according to claim 1, wherein the keyboard is connectable, through wired transmission, to an electronic device.

8. A miniaturized touch keyboard structure, comprising:
a keyboard, which comprises a plurality of control keys and a blank key functioning as a spacebar key, the keyboard comprising at least one control module arranged therein, the control module comprising a touch controller; and at least one touchpad, which is arranged in the keyboard and immediately adjacent to the blank key and is electrically connected to the control module, such that the touchpad is set at each of two locations that are respectively and immediately rightward and leftward of the blank key, the touchpad having a surface area that is smaller than or substantially equal to $2\times 2$ cm$^2$;

wherein the touch controller is operable to conduct a touch operation with the touchpad and the touch controller provides a high signal-to-noise ratio (SNR) to achieve relatively high recognition speed and sensitivity for allowing the touchpad to achieve relatively high preciseness of touch operation within a limited area, so that the touchpad is matched with a high image quality display to allow the touchpad to precisely control a cursor displayed on the high image quality display.

9. The miniaturized touch keyboard structure according to claim 8, wherein the touchpad has a surface that is planar, convex curved, or recessed.

10. The miniaturized touch keyboard structure according to claim 8, wherein the touchpad has sensitivity and moving speed of a touch operation that are controlled by predetermined software.

11. The miniaturized touch keyboard structure according to claim 8, wherein the touchpad is formed of a Mylar material of PET polyester film or the touchpad has a surface that is formed of a Mylar material of PET polyester film.

12. The miniaturized touch keyboard structure according to claim 8, wherein the control module comprises a wireless transmission unit and a power supply unit, the wireless transmission unit being electrically connected to the control keys, the blank key, and the touchpad, a signal from the control keys, the blank key, and the touchpad being transmitted wirelessly through the wireless transmission unit; and the power supply unit supplies electrical power to the control module.

13. The miniaturized touch keyboard structure according to claim 12, wherein the power supply unit is electrically connected to the wireless transmission unit and the touchpad to supply electrical power to the wireless transmission unit and the touchpad.

14. The miniaturized touch keyboard structure according to claim 8, wherein the keyboard is connectable, through wired transmission, to an electronic device.

\* \* \* \* \*